Patented Mar. 18, 1947

2,417,584

UNITED STATES PATENT OFFICE 2,417,584

METHOD OF PRODUCING ANTIBACTERIAL AGENT

John Howard Birkinshaw, Pinner, and Stephen Ernest Michael, Croyden, England, assignors to Therapeutic Research Corporation of Great Britain Limited, London, England, a corporation of Great Britain No Drawing. Application October 8, 1943, Serial No. 505,540. In Great Britain September 17, 1943

4 Claims. (Cl. 195—36)

This invention relates to a new therapeutic material and method of producing same.

It is already known that the products formed by certain molds during their metabolism are of therapeutic value. In particular the metabolism product of *Penicillium notatum*, known as penicillin, is of high therapeutic value as an antibacterial agent. Penicillin, however, is produced and extracted on a commercial scale only with the greatest difficulty, owing partly to the small quantities of it produced by *Penicillium notatum* and partly to its instability with lapse of time and particularly when subjected to the action of heat, acid or oxygenating conditions.

It is the object of this invention to provide a new therapeutic material having a useful degree of anti-bacterial activity but a higher degree of stability than penicillin and more readily produced and purified than that substance.

In accordance with the present invention a culture is prepared from one or other of the molds *Penicillium patulum* and *Penicillium expansum* and from the metabolism solution in which the mold has been grown is extracted an ether-soluble anti-bacterial substance.

Conveniently the isolation of the anti-bacterial substance may be effected by solvent extraction, vacuum evaporation and recrystallization. The solvent employed may be ether or any other organic solvent wherein the anti-bacterial substance is soluble and which is immiscible with or only slightly soluble in water, for example ethyl acetate or amyl acetate.

This anti-bacterial substance has been identified chemically as anhydro-3-hydroxymethylene-tetrahydro-γ-pyrone-2-carboxylic acid, having the structural formula

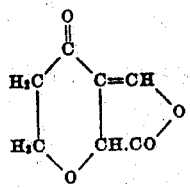

The invention will be more clearly understood by the following description (which is given by way of illustration only) of one mode of producing and isolating the anti-bacterial substance and of the properties of a sample thereof.

Fifty-two one liter flasks each containing 350 cc. of Raulin-Thom (5%) glucose medium having the following composition

| | | |
|---|---|---|
| Glucose | grams | 75 |
| Tartaric acid | do | 4 |
| Diammonium tartrate | do | 4 |
| $(NH_4)_2HPO_4$ | do | 0.6 |
| $K_2CO_3$ | do | 0.6 |
| $MgCO_3$ | do | 0.4 |
| $(NH_4)_2SO_4$ | do | 0.25 |
| $ZnSO_4.7H_2O$ | do | 0.07 |
| $FeSO_4.7H_2O$ | do | 0.07 |
| Distilled water | cc | 1,500 | were sterilized by autoclaving and sown with *Penicillium patulum* Bainier. This mold strain is a member of the Asymmetrica-Fasciculata and is very similar in appearance to *Pencillium urticae* Bainier, but is more restricted in its growth and less complex in structure than and lacks the odor of the latter strain.

The flasks were incubated at 24° C. for fourteen days, in the dark. The growth of the fungus was vigorous. In the early stages its upper surface was white, changing later to light green. The under side was brick red in color. The metabolism solution gradually became brownish-yellow.

The culture fluid was filtered from the mycelium. It had a volume of 16.2 litres with a glucose content (by polarimeter estimation) of 0.61% and a pH of 4.9. The filtrate without further treatment was evaporated in vacuo at a bath temperature not exceeding 45° C. to a volume of about one liter. It was then extracted three times with ethyl acetate, one liter each time. It was necessary to centrifuge to obtain efficient separation. The ethyl acetate was evaporated off in vacuo and the residual oil further freed from the acetate by drying under vacuum over-night. The product weighed 65 grams and was a mixture of oil and crystals. It lost a further two grams in weight after drying for three days.

This product was dissolved in 1500 cc. of ether by refluxing. It was filtered to free it from a small amount of insoluble matter. The ether solution was passed through an absorption column containing about 200 grams of alumina $(Al_2O_3)$ which had previously been washed with dilute hydrochloric acid and dried at 100° C. The column was washed with 1500 cc. of fresh ether and the total ether solutions evaporated to about 250 cc. The solution was chilled and 19.6 grams of crystals were recovered. These crystals were colorless plates or tablets and consisted of the substantially pure anti-bacterial substance above specified. Their melting point was 111°–112° C.

The anti-bacterial substance in the dry crystalline form is stable; although when in solution it has some tendency to decompose or lose its activity on heating or storage, particularly under alkaline conditions, it is even then far more stable and much more easily handled than penicillin.

The substance is neutral in reaction and is fairly soluble in water, ether and many other organic solvents. It is optically inactive and has reducing properties. It may be hydrolyzed by alkalies or acids.

Its empirical formula is $C_7H_6O_4$.

Acetyl and other acyl derivatives may be formed from it by treatment with customary acylating agents, such as acetic anhydride. The acetyl derivative crystallizes in colorless prisms melting at 116°–117° C.

The substance is an active anti-bacterial agent. The crude metabolism product will inhibit the growth of Staphylococcus aureus at a dilution of 1:80 to 1:160, the purified crystalline material at a dilution of 1:64,000.

In each case only an extremely dilute solution is employed, say 1 in 5,000 to 1 in 20,000. According to a feature of the invention the anti-bacterial agent may be employed in a buffered, slightly acid solution. This is more stable than the plain solution. The buffered solution should have a pH of 5.5 to 6.5 and preferably of approximately 6.0.

By way of example only the following description of one method of preparing and using such a buffered solution is given.

A phosphate buffer solution of pH 6.0 was prepared by dissolving 27.331 gm. of acid potassium phosphate in a litre of distilled water, to 250 cc. of which solution 57 cc. of N/10 sodium hydroxide were added, the resulting solution being well mixed and then made up to one litre with distilled water. 0.050 gm. of the pure crystalline anti-bacterial substance was dissolved in 5 cc. of this buffer solution and diluted to 100 cc. with sterile distilled water, forming a 1 in 2,000 stock solution. Immediately before use one part of this stock solution is added to nine parts of sterile distilled water to give a 1 in 20,000 solution, or two parts are added to eight parts water to form a 1 in 10,000 solution, and so on.

A further therapeutic use for the anti-bacterial agent has been found in that it has a pharmacological action as an anti-diuretic. Owing to the toxic action of the substance on injection and to some extent on oral administration it must be used with caution, but about 0.3 to 5 mg. of the substance per kilogram of bodyweight may be administered by sub-cutaneous injection, causing partial or complete inhibition of urine excretion.

The foregoing description is given by way of illustration only and the invention is to be limited only in accordance with the scope of the following claims.

We claim:

1. A process for the production of an anti-bacterial agent comprising making a culture of a mold selected from the group consisting of Penicillium patulum and Penicillium expansum, and extracting the ether soluble substances present in the mold metabolism solution by solvent extraction with a solvent selected from the group consisting of ether, ethyl acetate and amyl acetate.

2. A process for the production of an anti-bacterial agent comprising making a culture of the mold Penicillium patulum Bainier and extracting the ether soluble substances present in the mold metabolism solution by solvent extraction with a solvent selected from the group consisting of ether, ethyl acetate and amyl acetate.

3. A process for the production of an anti-bacterial agent comprising making a culture of a mold selected from the group consisting of Penicillium patulum and Penicillium expansum, and extracting the ether soluble substances present in the mold metabolism solution by solvent extraction with an organic solvent selected from the group consisting of ether, ethyl acetate and amyl acetate evaporation in vacuo at a temperature of not over 45° C., crystallization, solution in an organic solvent selected from the aforesaid group of organic solvents and recrystallization.

4. The process claimed in claim 3 in which the solution prior to the final recrystallization is purified by passage through an absorption column.

JOHN HOWARD BIRKINSHAW.
STEPHEN ERNEST MICHAEL.

REFERENCES CITED

The following references are of record in the file of this patent:

UNITED STATES PATENTS

| Number | Name | Date |
| --- | --- | --- |
| 2,138,540 | Ford | Nov. 29, 1938 |
| 2,361,624 | Hamilton | Oct. 31, 1944 |

OTHER REFERENCES

Lancet, Nov. 20, 1943, pages 625–634.
Biochem. Journal, vol. 36 (1932), pages 1441–1458.
Biochem. Journal, vol. 36, Dec. 1942, page 829.
Lancet, Jan. 22, 1944, page 112.
British Journal Experimental Pathology, vol. 23, Aug. 1942, pages 202–204.